(12) United States Patent
Ego (10) Patent No.: US 8,509,497 B2
(45) Date of Patent: Aug. 13, 2013

(54) PERSON RECOGNITION METHOD AND APPARATUS

(75) Inventor: Shunta Ego, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 466 days.

(21) Appl. No.: 12/845,413

(22) Filed: Jul. 28, 2010

(65) Prior Publication Data

US 2011/0026782 A1 Feb. 3, 2011

(30) Foreign Application Priority Data

Jul. 29, 2009 (JP) ................................. 2009-176803

(51) Int. Cl.
*G06K 9/00* (2006.01)

(52) U.S. Cl.
USPC ............ 382/118; 382/103; 382/154; 701/468

(58) Field of Classification Search
USPC .................. 382/128, 118, 220, 190, 191, 192
See application file for complete search history.

(56) References Cited

U.S. PATENT DOCUMENTS

| | | | | |
|---|---|---|---|---|
| 5,642,431 | A * | 6/1997 | Poggio et al. | 382/118 |
| 5,839,088 | A * | 11/1998 | Hancock et al. | 701/468 |
| 6,608,914 | B1 | 8/2003 | Yamaguchi et al. | |
| 6,697,505 | B2 | 2/2004 | Yamaguchi et al. | |
| 6,745,126 | B1 * | 6/2004 | Pavlak et al. | 701/50 |
| 7,158,657 | B2 * | 1/2007 | Okazaki et al. | 382/118 |
| 7,239,725 | B2 * | 7/2007 | Dobashi | 382/118 |
| 7,295,922 | B2 * | 11/2007 | Simon Robert et al. | 701/409 |
| 7,324,670 | B2 * | 1/2008 | Kozakaya et al. | 382/118 |
| 7,330,591 | B2 * | 2/2008 | Fukui et al. | 382/190 |
| 7,663,671 | B2 * | 2/2010 | Gallagher et al. | 348/231.2 |
| 8,155,398 | B2 * | 4/2012 | Togashi | 382/118 |
| 8,295,568 | B2 * | 10/2012 | Sakaida | 382/128 |
| 2002/0003495 | A1 * | 1/2002 | Johnstone et al. | 342/357.13 |
| 2003/0060215 | A1 * | 3/2003 | Graham | 455/456 |
| 2004/0161166 | A1 * | 8/2004 | Enomoto | 382/296 |
| 2004/0228505 | A1 * | 11/2004 | Sugimoto | 382/118 |

(Continued)

FOREIGN PATENT DOCUMENTS

| | | |
|---|---|---|
| JP | 2000090264 A | 3/2000 |
| JP | 2003044858 A | 2/2003 |

(Continued)

OTHER PUBLICATIONS

Notification of Reasons for Refusal, dated Mar. 13, 2013, issued in corresponding JP Application No. 2009-176803, 5 pages in English and Japanese.

*Primary Examiner* — Vu Le
*Assistant Examiner* — Aklilu Woldemariam
(74) *Attorney, Agent, or Firm* — Sughrue Mion, PLLC (57) ABSTRACT

Subtracting the date of taking a registrant's face image from the date of taking a photographic image of a person to be recognized, the number of elapsed years Y of the registrant's face image is calculated. If Y<5, an unsophisticated image comparator is selected. If 5≦Y<10, a first face parts comparator is selected to calculate the degree of resemblance between the photographic image and the registrant's face image more precisely than the unsophisticated image comparator. If 10≦Y, a second face parts comparator is selected. If the face image is a child's, the second face parts comparator compares the photographic image not only with the child's face image but also with his/her cognate's face image. After the photographic image is compared with every registrant's face image, the personal data of the top four registrants having the highest degree of resemblance is displayed on an LCD.

13 Claims, 5 Drawing Sheets

(56) References Cited

U.S. PATENT DOCUMENTS

| | | | |
|---|---|---|---|
| 2007/0175998 A1* | 8/2007 | Lev | 235/454 |
| 2008/0137919 A1* | 6/2008 | Kozakaya et al. | 382/118 |
| 2008/0260255 A1* | 10/2008 | Fukushima et al. | 382/190 |
| 2009/0060295 A1* | 3/2009 | Inoue et al. | 382/118 |
| 2009/0316962 A1* | 12/2009 | Sun et al. | 382/118 |
| 2010/0034432 A1* | 2/2010 | Ono et al. | 382/118 |
| 2010/0098342 A1* | 4/2010 | Davis et al. | 382/220 |
| 2010/0100540 A1* | 4/2010 | Davis et al. | 707/728 |
| 2010/0100548 A1* | 4/2010 | Scott et al. | 707/741 |

FOREIGN PATENT DOCUMENTS

| | | |
|---|---|---|
| JP | 2004-054888 A | 2/2004 |
| JP | 2004-139259 A | 5/2004 |
| JP | 2004192544 A | 7/2004 |
| JP | 2004258764 A | 9/2004 |
| JP | 2005218796 A | 8/2005 |
| JP | 2007058393 A | 3/2007 |
| JP | 2007-114931 A | 5/2007 |

* cited by examiner

PERSON RECOGNITION METHOD AND APPARATUS

BACKGROUND OF THE INVENTION

1. Field of the Invention

The present invention relates to a person recognition method and apparatus that retrieve personal data based on a taken photographic image.

2. Description Related to the Prior Art

Recently, there is a proposed apparatus that not only detects a person's face from a photograph, but also automatically recognizes who the person is (see U.S. Pat. Nos. 6,608,914 and 6,697,505). In this apparatus, characteristic values of features of the face, including the positions of eyes, nose, mouth and the like, extracted from a photographic image of the person to be recognized are compared with those extracted from a face image of a registrant registered in advance in a registered information holding section (database). Then, the registrant having a highest degree of resemblance is outputted as a recognition result.

Since the person's face ages with time, the above apparatus is so designed as to add the newly taken photographic image to the database as the face image, whenever carrying out person recognition. Also, Japanese Patent Laid-Open Publication No. 2004-54888 discloses a face recognition device in which the registered face image is deleted when getting old and ineffective, based on a lapse of time from the registration into the database, or a lapse of time from the latest recognition.

In a figure recognition device according to Japanese Patent Laid-Open Publication No. 2004-139259, registration data (face image used in recognition) is updated to the newly taken photographic image within a fixed time period from the registration to the database, whenever the person recognition is carried out, in accordance with change of the person's face. After a lapse of the period, the registration data is not updated anymore because the change in the person's face becomes small or negligible. Thus, eliminating the need for the update allows smooth recognition processing.

In any of the above apparatuses, the precision of the person recognition becomes worse, as the face image registered into the database gets old. Thus, the registrant's face image has to be updated on a regular basis.

SUMMARY OF THE INVENTION

An object of the present invention is to provide a person recognition method and apparatus that can precisely recognize a person even if a face image of a registrant registered in a database gets old.

To achieve the above and other objects, a person recognition method according to the present invention includes the steps of subtracting a date of taking a registrant's face image from a date of taking a photographic image of a person to be recognized, and calculating the number of elapsed years from the date of taking the registrant's face image, selecting one of a plurality of image comparison methods for comparing the photographic image with the registrant's face image in accordance with the number of elapsed years, comparing the photographic image with the registrant's face image by the selected image comparison method, and calculating a degree of resemblance between the photographic image and the registrant's face image, and displaying personal data of one or more registrants. The registrant's personal data with the higher degree of resemblance is given priority to be displayed.

The photographic image is preferably displayed on a screen of a display together with the personal data of at least one registrant. The personal data preferably includes the face image, a name, and an age of the registrant at the time of taking the face image.

If a registrant's cognate is already registered, the photographic image is compared with a cognate's face image, in addition to the registrant's face image. This is because of a general empirical rule in which a person tends to resemble his/her parent, brother, or sister of that age. It often happens that a recently taken person's photographic image resembles his/her cognate's face image that was taken twenty years ago, rather than his/her own face image that was taken twenty years ago, for example.

One of the plurality of image comparison methods is an unsophisticated image comparison method that is selected in the selecting step, if the number of elapsed years is less than a first threshold value. The unsophisticated image comparison method has the steps of dividing each of the photographic image and the face image into small areas, calculating an average color of each of the individual small areas, comparing the average colors of the corresponding small areas between the photographic image and the face image, and calculating the degree of resemblance between the photographic image and the face image in accordance with the number of the small areas having the similar average colors.

Another one of the plurality of image comparison methods is a first face parts comparison method that is selected in the selecting step, if the number of elapsed years is equal to or more than the first threshold value and less than a second threshold value. The first face parts comparison method has the steps of extracting face parts from each of the photographic image and the face image, and comparing at least one of the shape, color, and relative position of the face parts between the photographic image and the face image.

Further another one of the plurality of image comparison methods is a second face parts comparison method that is selected in the selecting step, if the number of elapsed years is equal to or more than the second threshold value. The second face parts comparison method has the steps of checking whether or not the cognate's personal data is accessorily registered, and if the cognate's personal data is accessorily registered, comparing the photographic image with the cognate's face image, in addition to comparison with the registrant's face image.

It is preferable that the person recognition method further include the steps of entering an age of the person to be recognized, calculating a registrant's current age, judging whether or not the difference between the age of the person to be recognized and the registrant's current age is within a predetermined allowance value, and excluding the registrant's personal data from comparison if the difference is out of the predetermined allowance value. This allows reduction in time required for the comparison, and performance of speedy person recognition. The registrant's current age is preferably calculated from a registrant's birthday contained in the personal data and the current date.

The degree of resemblance is preferably weighted in accordance with the number of elapsed years, so that the fewer the number of elapsed years, the higher the degree of resemblance becomes. If the two face images have the same degree of resemblance, the lately taken face image is ranked in a higher place, and hence the face image of the person that bears greater resemblance is displayed in the higher place.

The degree of resemblance is preferably weighted in accordance with a degree of consanguinity, so that the closer the degree of consanguinity, the higher the degree of resemblance becomes. Thus, the higher the possibility of resembling a person has, the likelier he/she has the high degree of resemblance. Accordingly, the face images are ranked without providing a feeling of strangeness.

A person recognition apparatus according to the present invention includes an elapsed year calculator, a comparison method selector, an image comparator, and a display. The elapsed year calculator subtracts the date of taking a registrant's face image from the date of taking a photographic image of a person to be recognized, and calculates the number of elapsed years from the date of taking the registrant's face image. The comparison method selector selects one of the plurality of image comparison methods for comparing the photographic image with the face image in accordance with the number of elapsed years. The image comparator compares the photographic image with the registrant's face image by the selected image comparison method, and calculates the degree of resemblance between the photographic image and the registrant's face image. One or more registrants' personal data is displayed on the display in descending order of the degree of resemblance.

The person recognition apparatus according to the present invention may be provided in a digital camera.

According to the present invention, the number of elapsed years from the date of taking the face image of the registrant registered in the database is calculated, and one of the comparison methods is selected in accordance with the number of elapsed years. This allows the efficient person recognition. Also, the personal data of the cognate of the registrant is accessorily registered, for the purpose of comparing the photographic image not only with the registrant's face image but also with the cognate's face image. Therefore, even if the registrant's face image stored in the database is too old to use, the person recognition is precisely carried out with use of the cognate's face image.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

Figure 1:
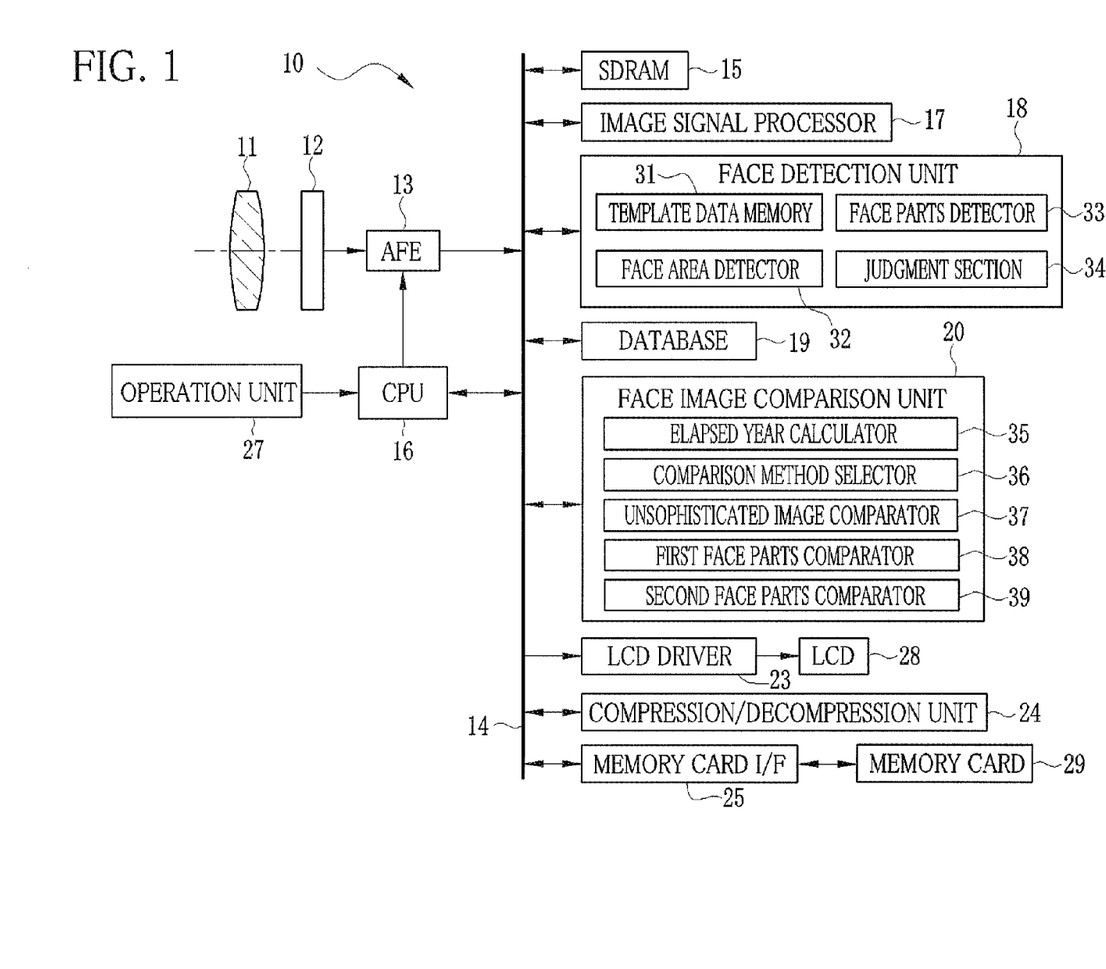
FIG. 1 is a block diagram of a digital camera that is provided with a person recognition apparatus according to a first embodiment.

In a digital camera 10 shown in FIG. 1, upon taking a photograph of a person's face i.e. a photographic image, personal data having a face image resemblant to the photographic image is retrieved from a database. The retrieved personal data of one or more registrants, each of which has the registrant's face image, a registrant's name, and a registrant's age at the time of taking the face image, is displayed on a liquid crystal display (LCD) together with the photographic image in a tiled manner. Thus, the photographed person is easily recognized through comparison with the displayed registrants' face images.

The digital camera 10 is provided with a taking lens 11, an imaging device 12 such as a CCD or a CMOS image sensor, and an analog front end processor (AFE) 13. The taking lens 11 takes in incident light from a scene, and forms an optical image on a light receiving surface of the imaging device 12. The imaging device 12 converts the optical image into image data. The AFE 13 applies to the image data various types of processing including correlated double sampling, gain adjustment, analog-to-digital conversion and the like.

The image data outputted from the AFE 13 is temporarily written to a SDRAM 15 as the photographic image through a data bus 14. To the data bus 14, there are connected a CPU 16, an image signal processor 17, a face detection unit 18, a database 19, a face image comparison unit 20, an LCD driver 23, a compression/decompression unit 24, and a memory card interface 25.

To the CPU 16, an operation unit 27 is connected to accept operation from a user. To the LCD driver 23, an LCD 28 (see FIG. 2) disposed on a rear face of a camera body 10a is connected. To the memory card interface 25, a memory card 29 for storing the photographic image is detachably connected.

The image signal processor 17 applies various types of processing including offset correction, gamma correction, and RGB-to-YC conversion to the photographic image written to the SDRAM 15. The image signal processor 17 also carries out exposure adjustment, white balance correction and the like, based on coordinates of a face area sent from the face detection unit 18. The image signal processor 17 further detects a focal point of the taking lens 11 from contrast of the image.

The face detection unit 18 is provided with a template data memory 31, a face area detector 32, a face parts detector 33, and a judgment section 34. In the template data memory 31, templates of various face patterns and various face parts patterns are stored in advance. The face area detector 32 compares the photographic image read from the SDRAM 15 with the face patterns read from the template data memory 31 to detect the person's face area from the photographic image. The face parts detector 33 refers to the face parts patterns to detect the face parts from the face area. The judgment section 34 determines the coordinates of the face area and coordinates of the face parts, based on detection results of the face area and the face parts. Then, the judgment section 34 sends the coordinates to the image signal processor 17.

The database 19 stores many registrants' personal data for use in comparison. Each registrant's personal data includes a registrant's name, ID number, face image, date of taking the face image, and birthday or age at the time of taking the face image. If the registrant is a child, personal data of his/her cognate or relative by blood such as parents, a brother, or a sister is accessorily registered as much as possible. The child's personal data has a tag that describes the ID number of the cognate's personal data and the relationship between the child and the cognate such as the degree of consanguinity. This is because as the child grows, he/she generally gets more resemblant to his/her cognate. Thus, if there is no recently taken child's face image stored in the database 19, it is effective to use his/her cognate's face image to detect the degree of resemblance. The closer the degree of consanguinity, the higher the resemblance becomes in general. Thus, it is preferable that the degree of resemblance be weighted in accordance with the degree of consanguinity.

The face image registered in the database 19 is not necessarily taken by the digital camera 10, but may be an image taken by another digital camera, as long as the data format of the image is readable by the digital camera 10.

The face image comparison unit 20 includes an elapsed year calculator 35, a comparison method selector 36, an unsophisticated image comparator 37, a first face parts comparator 38, and a second face parts comparator 39. The elapsed year calculator 35 calculates the number of years Y elapsed from the date of taking the face image of the personal data read out of the database 19 for comparison, and inputs the number of years Y to the comparison method selector 36.

The comparison method selector 36 selects a comparison method between the photographic image and the face image of the personal data, in accordance with the number of elapsed years Y inputted from the elapsed year calculator 35. If the number of elapsed years Y is less than a first threshold value Y1 e.g. five years, resemblance judgment is relatively easy, and hence the unsophisticated image comparator 37, which gives higher priority to comparison speed than precision, is chosen. If the number of elapsed years Y is equal to or more than the first threshold value Y1 and less than a second threshold value Y2 e.g. ten years, the first face parts comparator 38, which has higher comparison precision than the unsophisticated image comparator 37, is chosen. The number of elapsed years Y is the second threshold value Y2 or more, the second face parts comparator 39, which has the highest comparison precision, is chosen.

The unsophisticated image comparator 37 compares the photographic image with the face image of the personal data read from the database 19, with use of a predetermined image comparison algorithm. There are various image comparison algorithms available. In this embodiment, each face area detected in the photographic image and the face image is divided into small areas of N by N pixels (N≧1), and average color is obtained for each individual small area. Then, the average colors of the corresponding small areas are compared between the photographic image and the face image. The more the number of the small areas with the similar average colors, the higher the degree of resemblance is. Thus, the unsophisticated image comparator 37 can output a judgment result, that is, the degree of resemblance within a relatively short time. The average color of the small area means average intensity values of R, G, and B in the small area. It is preferable that the value of N be increased with increase in the number of elapsed years Y, in order to improve the comparison precision.

The first face parts comparator 38 compares the shape, the color, and the relative positions of the face parts, including eyes, nose, and mouth detected by the face parts detector 33 between the photographic image and the face image of the personal data, in order to totally determine the degree of resemblance. The shape, the color, and the relative positions of the face parts are hardly changed by makeup or aging, so that the first face parts comparator 38 can judge the degree of resemblance with higher precision than the unsophisticated image comparator 37.

The second face parts comparator 39 is basically the same as the first face parts comparator 38, except that the second face parts comparator 39 uses the face image of the personal data that was registered in the database 19 over ten years ago. Accordingly, if the personal data includes a child's face image, his/her current face (photographic image) is likely to be dramatically changed from his/her childhood face image stored. Therefore, the second face parts comparator 39 confirms whether or not the personal data has the tag describing the ID number, which indicates the presence of his/her cognate's personal data.

If the personal data has the tag describing the cognate's ID number, the second face parts comparator 39 reads the cognate's personal data from the database 19 based on the ID number, and compares the photographic image with the cognate's face image. If the degree of resemblance between the photographic image and the cognate's face image is equal to or higher than that between the photographic image and the child's face image, the cognate's face image is used instead of the child's face image. If the personal data has no tag describing the cognate's ID number, the comparison is carried out only with the child's face image.

Figure 2:
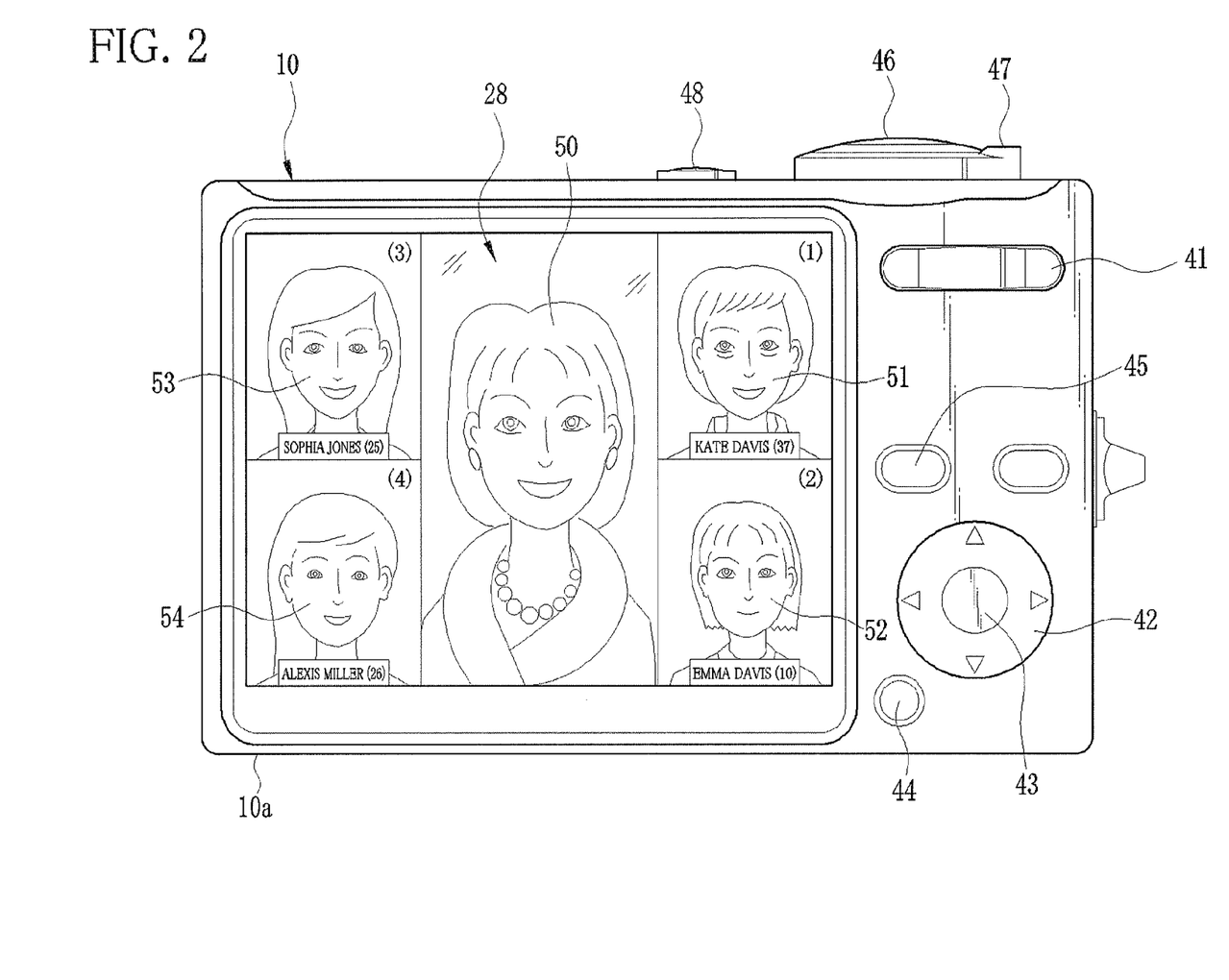
FIG. 2 is a rear view of the digital camera.

On the rear face of the camera body 10*a* of the digital camera 10, as shown in FIG. 2, there are provided a zoom lever 41 for changing a zoom of the taking lens 11, a multifunction cross key 42, a menu/enter key 43, a display/return key 44, and a reproduction mode key 45 and the like. On a top face of the camera body 10*a*, there are provided a shutter release button 46, a mode switching dial 47 rotatable around the shutter release button 46, and a power button 48. The lever, the keys, the buttons, and the dial 41 to 48 compose the operation unit 27 of FIG. 1.

Figure 3:
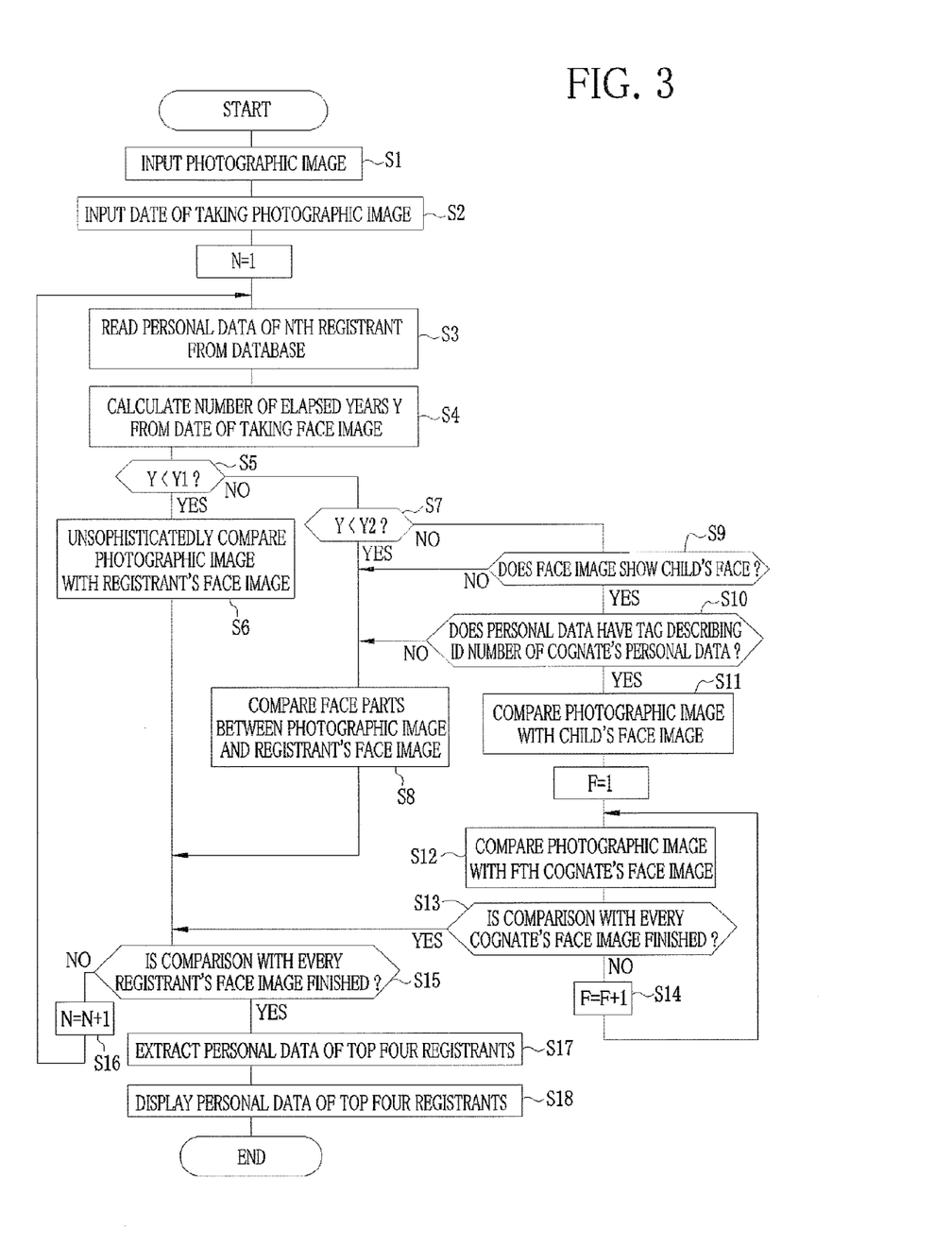
FIG. 3 is a flowchart of a resemblant face image extraction process.

A person recognition method of the digital camera 10 will be described with referring to a flowchart of FIG. 3. The digital camera 10 is firstly changed from a normal photograph mode into a person recognition mode for recognizing the photographed person, by rotating the mode switching dial 47. Then, in response to a push of the shutter release button 46, the person is photographed from waist up so that his/her face is seen clearly.

The image data outputted from the imaging device 12 is converted into digital data by the AFE 13, and temporarily written to the SDRAM 15 as the photographic image. For the person recognition, the photographic image is read from the SDRAM 15. The face area detector 32 successively reads the templates of the face patterns from the template data memory 31, and applies pattern matching processing to the photographic image to detect the face area of the person.

The face part detector 33 detects the face parts from the detected face area based on the face parts patterns. The judgment section 34 determines the coordinates of the face area and the coordinates of the face parts, based on the detection results. The photographic image including the coordinates is inputted to the face image comparison unit 20 (S1), and then the date of taking the photographic image is inputted thereto (S2).

The face image comparison unit 20 reads the personal data from the database 19 in reverse chronological order, for example (S3). The elapse year calculator 35 subtracts the date of taking the face image of the personal data from the date of taking the photographic image, to calculate the number of elapsed years Y (S4).

The number of elapsed years Y is inputted to the comparison method selector 36. If the number of elapsed years Y is less than the first threshold value Y1 e.g. five years (YES in S5), the comparison method selector 36 chooses the unsophisticated image comparator 37. The unsophisticated image comparator 37 divides the face area into the small areas, each of which is composed of N by N pixels (N≧1), in each of the photographic image and the face image of the personal data. Then, the unsophisticated image comparator 37 calculates the average colors of the individual small areas, and compares the average colors of the corresponding small areas between the photographic image and the face image. Thus, the degree of resemblance between the photographic image and the face image is easily obtained in a relatively short time (S6).

If the number of elapsed years Y is equal to or more than the first threshold value Y1 and less than the second threshold value Y2 e.g. ten years (NO in S5 and YES in S7), the comparison method selector 36 chooses the first face parts comparator 38. The first face parts comparator 38 compares the shape, the color, and the relative positions of the face parts including eyes, nose, and mouth between the photographic image and the face image of the personal data (S8), in order to comprehensively calculate the degree of resemblance. Thus, the first face parts comparator 38 judges the degree of resemblance more precisely than the unsophisticated image comparator 37.

If the number of elapsed years Y is equal to or more than the second threshold value Y2 (NO in S7), the comparison method selector 36 chooses the second face parts comparator 39. The second face parts comparator 39 reads from the personal data the age of the registrant at the time of taking the face image, and checks whether or not the face image shows a child's face (S9). If the age is, for example, ten years old or less (YES in S9), the second face parts comparator 39 judges that the face image shows the child's face, and checks whether or not the personal data has the tag describing the ID number of the personal data of the child's cognate (S10).

If the personal data has the tag (YES in S10), the second face parts comparator 39 compares the face parts between the photographic image and the child's face image (S11), and then reads the cognate's personal data from the database 19 based on the ID number listed in the tag. Then, the second face parts comparator 39 compares the face parts between the photographic image and the cognate's face image (S12). Thus, the comparison is carried out with use of the cognate's face image, in addition to the child's face image.

If the personal data of the plurality of cognates is registered, in other words, if the personal data of a child's brother or sister exists in addition to the personal data of a child's mother (NO in S13), for example, a number F is incremented by one in S14, so that the comparison is carried out between the photographic image and the next face image of the registered cognate (S12, S13) until the photographic image is compared with every cognate's face image. On the other hand, if the child's personal data does not have the tag (NO in S10), the comparison is carried out only with the registrant's (child's) face image (S8).

In a case where the number of elapsed years Y is equal to or more than the second threshold value Y2 and the cognate's personal data is registered in the database 19, the cognate's face image may be used prior to the child's face image in the comparison.

The face image comparison unit 20 increments the number N (Nth registrant) by one (S16), and repeats a sequence from S3 to S15 until the comparison between the photographic image and every registrant's face image is completed.

Upon completion of the comparison (YES in S15), the face image comparison unit 20 extracts the personal data of the top four registrants in descending order of the degree of resemblance to the photographic image (S17), and informs the CPU 16 of the extracted personal data. The extracted personal data may be the registrant's personal data, or the accessorily registered cognate's personal data. The fewer the number of elapsed years Y, the heavier the degree of resemblance is weighted. In other words, when a plurality of face images have the same degree of resemblance, the face image that has the later taking date is ranked in a higher place. Accordingly, the face image that is likely to be felt resemblant is ranked in the higher place.

If the degree of resemblance to the cognate's face image is same as or higher than that to the child's face image, the cognate's face image is ranked higher than the child's face image. In general, the closer the degree of consanguinity, the higher the degree of resemblance becomes. Therefore, when the plurality of cognates' face images have the same degree of resemblance, the face image of the cognate who has the closer degree of consanguinity is ranked in a higher place.

In response to a command from the CPU 16, the LCD driver 23 drives the LCD 28 to display a photographic image 50 and four face images 51 to 54 having the highest degree of resemblance, as shown in FIG. 2. A screen of the LCD 28 is divided into five sub frames, and the photographic image 50 of the person to be recognized is displayed in the middle largest sub frame. In the upper right sub frame (1) of the screen, the face image 51 of a person who has the highest degree of resemblance is displayed with her name and age of taking the face image 51. In a like manner, the face images 52 to 54 of persons who have the second to fourth highest degree of resemblance are displayed in the lower right sub frame (2), the upper left sub frame (3), and the lower left sub frame (4), respectively, with their names and ages at the time of taking the face images 52 to 54. If the displayed person is the registrant's cognate, relationship with the registrant is preferably displayed too.

In this embodiment, "Kate Davis (37 years old)" is displayed in the sub frame (1), and she is a mother of "Emma Davis (10 years old)" displayed in the sub frame (2). The person seen in the photographic image 50 seems to be in her twenties, and is younger than Kate Davis. Therefore, the person in the photographic image is recognized as Emma Davis, and her childhood face image is the face image 52 displayed in the sub frame (2).

As described above, the number of elapsed years Y is calculated based on the date of taking the face image of the personal data read from the database 19. The comparison method between the photographic image and the face image of the personal data is selected in accordance with the number of elapsed years Y, and hence the person recognition can be precisely carried out, even if the person's face image having registered in the database 19 gets old. Furthermore, even if the person's face image that has registered in the database 19 is too old to use, the comparison is carried out with use of the face image of the person's cognate.

The photographic image 50 is then registered in Emma Davis's personal data as a latest face image. The latest face image is used instead of the old face image for the subsequent comparison.

Figure 4:
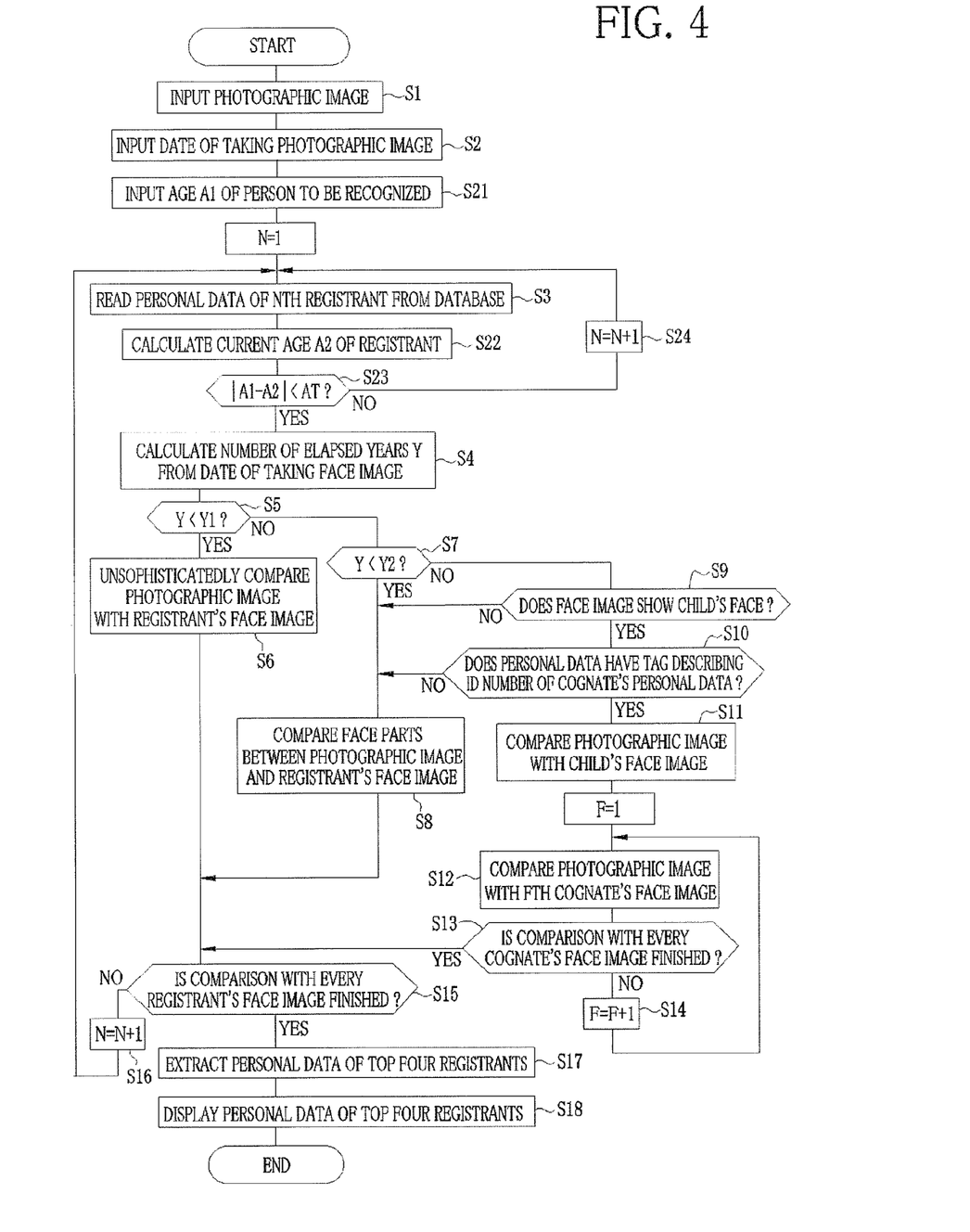
FIG. 4 is a flowchart of a resemblant face image extraction process according to a second embodiment.

Next, a person recognition method according to a second embodiment will be described with referring to a flowchart of FIG. 4. In the person recognition method of the second embodiment, an age A1 of the person to be recognized is initially inputted. The person recognition apparatus judges whether or not each registrant is appropriate for comparison based on the age A1 of the person to be recognized and a registrant's current age A2, and the comparison is carried out with only the personal data of the appropriate registrants. The same reference numbers as the first embodiment refer to the same or similar steps, and description thereof will be omitted.

After the photographic image of the person to be recognized (S1) and the date of taking the photographic image (S2) are inputted, the user inputs the age A1 of the person to be recognized from the operation unit 27 (S21). The face image comparison unit reads the personal data from the database 19 (S3), and calculates the registrant's current age A2, based on the date of taking the face image and the registrant's age at the time of taking the face image, which are contained in the personal data, and the current date (S22).

The face image comparison unit 20 checks whether or not the ages A1 and A2 satisfy the following expression:

$$|A1-A2|<AV$$

Wherein, AV is an allowance value, e.g. five (years old) of a difference between the age A1 of the person to be recognized and the registrant's current age A2. If the ages A1 and A2 satisfy the above expression (YES in S23), the comparison is carried out between the photographic image and the registrant's face image. If the ages A1 and A2 do not satisfy the above expression (NO in S23), the comparison with this registrant's personal data is judged to be unnecessary.

In the case of NO in S23, the number N is incremented by one (S24), and the next registrant's personal data is read from the database (S3). In the case of YES in S23, on the other hand, the elapsed year calculator 35 calculates the number of elapsed years Y from the date of taking the face image of the personal data (S4). Since the following sequence is same as that of the first embodiment, description thereof will be omitted.

In this embodiment, the age of the person to be recognized is inputted in advance, for the purpose of excluding the comparison with the registrant who is much older or younger than the person to be recognized. Therefore, it is possible to shorten time required for the comparison.

Figure 5:
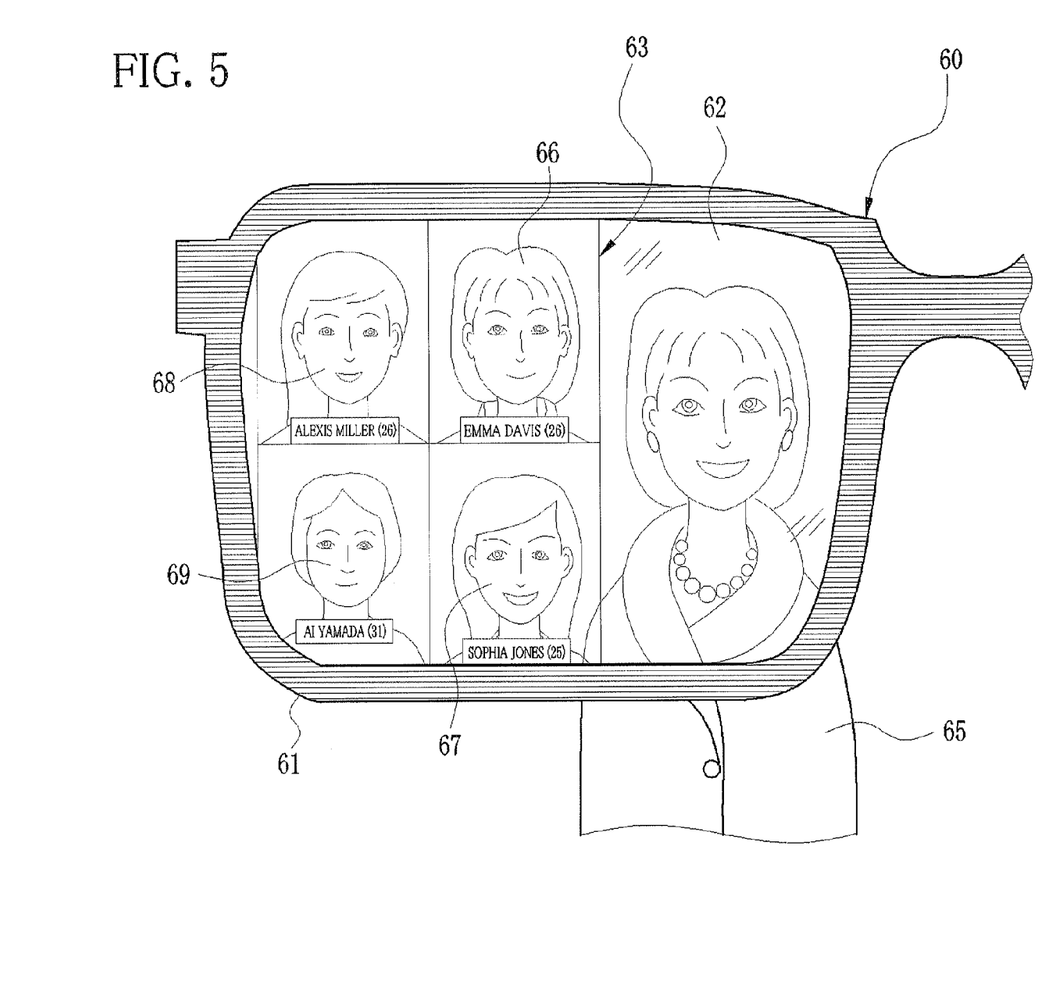
FIG. 5 is an explanatory view of eyeglasses that are provided with a person recognition apparatus according to a third embodiment.

In a third embodiment, the face images, the names and the ages of the top four registrants having the highest degree of resemblance are displayed on a transmissive LCD incorporated in eyeglasses 60. As shown in FIG. 5, a transparent glass 62 about one-third the size of an eyeglass frame 61 is fitted into the single eyeglass frame 61 on a right portion thereof. A transmissive LCD 63 about two-thirds the size of the eyeglass frame 61 is fitted into a remaining area of the eyeglass frame 61. The transmissive LCD 63 is transparent as with the transparent glass 62, when no image is displayed thereon.

A subminiature CCD camera (not illustrated) is embedded in the eyeglass frame 61, to capture a photographic image of a person 65 to be recognized. The photographic image is sent via a wireless communication system like Bluetooth to a terminal device such as a notebook computer put in a pocket of a jacket or a purse. Instead of the CCD camera, a CMOS camera with a CMOS image sensor may be used.

As with the digital camera 10 of the first embodiment, the notebook computer is provided with a SDRAM, a CPU, an image signal processor, a face detection unit, a database, a face image comparison unit, an LCD driver, a compression/decompression unit, a memory card interface and the like, in addition to the wireless communication system. The notebook computer extracts the personal data of the top four registrants whose face images have the highest degree of resemblance to the photographic image, and sends the extracted personal data to the eyeglasses 60 via the wireless communication system. Then, the personal data of the top four registrants are displayed on the transmissive LCD 63.

A user putting on the eyeglasses 60 compares the person 65 seen through the transparent glass 62 with face images 66 to 69 displayed on the transmissive LCD 63, in order to check who the person 65 is.

As described above, the person 65 to be recognized is photographed by the miniature CCD camera embedded in the eyeglasses 60, and the personal data of the registrants who are resemblant to the person 65 is displayed on the transmissive LCD 63 fitted into the eyeglass frame 61. Accordingly, the user can check the name of the person 65 without the person 65 being aware of it. Instead of the transparent glass 62, a prescription lens may be usable.

In this embodiment, the transparent glass 62 and the transmissive LCD 63 are fitted into the single eyeglass frame 61, but may be fitted into both eyeglass frames 61 instead. The transmissive LCD 63 of larger size may be fitted into the whole of the eyeglass frame 61. In this case, apart of the transmissive LCD 63 may not display the personal data, to make the part transparent like the transparent glass.

In the above embodiments, the comparison is carried out on the face image of every registrant registered in the database, but the comparison may be ended at the instant when the face image that has the extremely high degree (approximately 100%) of resemblance is found out. In this case, are displayed the face image of the registrant with the extremely high degree of resemblance and the face images of the top three registrants that are found out before the end of the comparison. This facilitates shortening time required for the comparison (time required from taking the photographic image of the person to be recognized to displaying the face images of the resemblant registrants).

In the above embodiments, the unsophisticated face image comparison unit 37 calculates the average color of each of the small areas, each of which is composed of N by N pixels (N≧1), in both of the two images to be compared, and compares the average colors of the corresponding small areas. The unsophisticated image comparator 37 may use another image comparison algorithm such as a quadtree algorithm, calculating an error of mean square or an SN ratio, comparison of outlines, or the like.

In the above embodiments, the personal data of only the top four registrants having the highest degree of resemblance is displayed, but the display may be scrolled down to the personal data of the subsequent registrants having the lower degree of resemblance.

In the above embodiments, the registrant's name and age of taking the face image are displayed together with his/her face image. In addition to that, the registrant's hometown, alma mater, company and the like may be displayed.

In the above first and second embodiments, the person recognition apparatus is applied to the digital camera, but may be applied to another type of electronic equipment, e.g. a camera-equipped cellular phone. In this case, taking a photograph of the person to be recognized by the cellular phone, instead of by the digital camera, makes the person less aware of being photographed.

In the second embodiment, the allowance value AV is set at five (years old), but may be another value such as three or seven. Instead of the above expression, the following expression may be used:

$$(A1-A2)^2<(AV)^2$$

The present invention is applicable to a door phone system. In this case, a person who is approaching a door is automatically detected and photographed, and the face image resemblant to the photographic image is chosen from the database to check who the person is.

According to the present invention, when the registrant's face image is old, his/her cognate's face image is used in the comparison. Thus, the person recognition apparatus can remind the user of the name of a friend, for example, who has visited the user for the first time in years.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A person recognition method for comparing a photographic image showing a face of a person to be recognized with face images of a plurality of registrants registered in a database, the person recognition method comprising the steps of:
   determining a date of taking a photograph of a person to be recognized;
   subtracting a date of taking a registrant's face image from the date of taking the photographic image of the person to be recognized, and calculating a number of elapsed years from the date of taking the registrant's face image;
   selecting one of a plurality of image comparison methods for comparing the photographic image with the registrant's face image in accordance with the number of elapsed years;
   comparing the photographic image with the registrant's face image by the selected image comparison method, and calculating a degree of resemblance between the photographic image and the registrant's face image using the selected image comparison method; and
   displaying personal data of the one or more registrants, the personal data with the higher degree of resemblance being given a high priority to be displayed.

2. The person recognition method according to claim 1, wherein the photographic image is displayed on a screen of a display together with the personal data of at least one of the registrants.

3. The person recognition method according to claim 1, wherein the registrant's personal data includes the registrant's face image, a registrant's name, and a registrant's age at the time of taking the face image.

4. The person recognition method according to claim 1, wherein if a registrant's cognate is already registered, the photographic image is compared with a cognate's face image, in addition to the registrant's face image.

5. The person recognition method according to claim 1, wherein one of the plurality of image comparison methods is an unsophisticated image comparison method being selected in the selecting step if the number of elapsed years is less than a first threshold value, the unsophisticated image comparison method comprising the steps of:
   dividing each of the photographic image and the face image into small areas;
   calculating an average color of each of the individual small areas;
   comparing the average colors of the corresponding small areas between the photographic image and the face image; and
   calculating the degree of resemblance between the photographic image and the face image in accordance with a number of the small areas having the similar average colors.

6. The person recognition method according to claim 5, wherein another one of the plurality of image comparison methods is a first face parts comparison method being selected in the selecting step if the number of elapsed years is equal to or more than the first threshold value and less than a second threshold value, the first face parts comparison method comprising the steps of:
   extracting face parts from each of the photographic image and the face image; and
   comparing at least one of a shape, a color, and a relative position of the face parts between the photographic image and the face image.

7. The person recognition method according to claim 6, wherein further another one of the plurality of image comparison methods is a second face parts comparison method being selected in the selecting step if the number of elapsed years is equal to or more than the second threshold value, the second face parts comparison method comprising the steps of:
   checking whether or not the personal data of a registrant's cognate is accessorily registered; and
   if the cognate's personal data is accessorily registered, comparing the photographic image with a cognate's face image, in addition to the registrant's face image.

8. The person recognition method according to claim 1, further comprising the steps of:
   entering an age of the person to be recognized;
   calculating a registrant's current age;
   judging whether or not a difference between the age of the person to be recognized and the registrant's current age is within a predetermined allowance value; and
   if the difference is out of the predetermined allowance value, excluding the registrant's personal data from comparison.

9. The person recognition method according to claim 8, wherein the registrant's current age is calculated from a registrant's birthday contained in the registrant's personal data and the current date.

10. The person recognition method according to claim 4, wherein the degree of resemblance is weighted in accordance with the number of elapsed years, so that the fewer the number of elapsed years, the higher the degree of resemblance becomes.

11. The person recognition method according to claim 4, wherein the degree of resemblance is weighted in accordance with a degree of consanguinity of the cognate, so that the closer the degree of consanguinity, the higher the degree of resemblance becomes.

12. A person recognition apparatus for comparing a photographic image showing a face of a person to be recognized with face images of a plurality of registrants registered in a database, and displaying personal data of the registrant having the face image resembling the photographic image, the person recognition apparatus comprising:
   a unit to input a date of taking of a photograph of a person to be recognized;
   an elapsed year calculator for subtracting a date of taking a registrant's face image from a date of taking the photographic image of the person to be recognized, and calculating a number of elapsed years from the date of taking the registrant's face image;
   a comparison method selector for selecting one of a plurality of image comparison methods for comparing the photographic image with the registrant's face image in accordance with the number of elapsed years;
   an image comparator for comparing the photographic image with the registrant's face image by the selected image comparison method, and calculating a degree of resemblance between the photographic image and the registrant's face image using the selected comparison method; and
   a display for displaying the personal data of the one or more registrants in descending order of the degree of resemblance.

13. The person recognition apparatus according to claim 12, being provided in a digital camera.

* * * * *